No. 756,626. Patented April 5, 1904.

UNITED STATES PATENT OFFICE.

FRANK HAMELL, OF AUGRES, MICHIGAN.

METHOD OF PRESERVING FISH.

SPECIFICATION forming part of Letters Patent No. 756,626, dated April 5, 1904.

Application filed August 6, 1903. Serial No. 168,520. (No specimens.)

*To all whom it may concern:*

Be it known that I, FRANK HAMELL, a citizen of the United States, residing at Augres, in the county of Arenac and State of Michigan, have invented certain new and useful Improvements in Methods of Preserving Fish, of which the following is a specification.

This invention relates to a process of treating fish whereby the same are preserved and rendered palatable, appetizing, and ready for instant use.

In accordance with this invention the fish after being dressed and cut, if needs be, are placed in brine for several hours. After the salt has penetrated the meat the fish are removed from the brine and allowed to drain and are then steamed over a compound consisting of vinegar, spices, soda, and sugar. When cooked to the proper degree, the fish are packed in cans, tubs, jars, or other vessels and are covered with the compound and are hermetically sealed. Fish treated in the manner stated may be kept any length of time and preserve their flavor and are edible without requiring to be further cooked or treated.

In preparing the compound I add to one gallon of cider or other vinegar one-half pound brown sugar, one-quarter ounce bicarbonate of soda, and one-eighth to one-half ounce each of the spices.

The spices consist of cloves, allspice, mace, bay-leaves, and such ingredients as are commonly employed in the preparation and conserving of different kinds of food. The vinegar, soda, and sugar possess a preservative quality and in connection with the spices prevent fermentation or decay. The spices may be added to the vinegar in variable quantity, as may be determined by the particular kind of fish under treatment.

Having thus described the invention, what is claimed as new is—

The herein-described method of preserving fish, the same consisting of placing the fish in brine, then draining the same, and subsequently subjecting the fish to steam arising from a compound composed of vinegar, spices, soda and sugar in about the proportions specified, and, finally, packing the fish in vessels, covering the same with the said compound and hermetically sealing the packages, substantially as specified.

In testimony whereof I affix my signature in presence of two witnesses.

FRANK HAMELL. [L. S.]

Witnesses:
 GEO. H. GRIMORE,
 E. G. COLE.